F. C. CLARKE.
SUN GLASSES.
APPLICATION FILED MAY 19, 1915.
1,181,291.
Patented May 2, 1916.
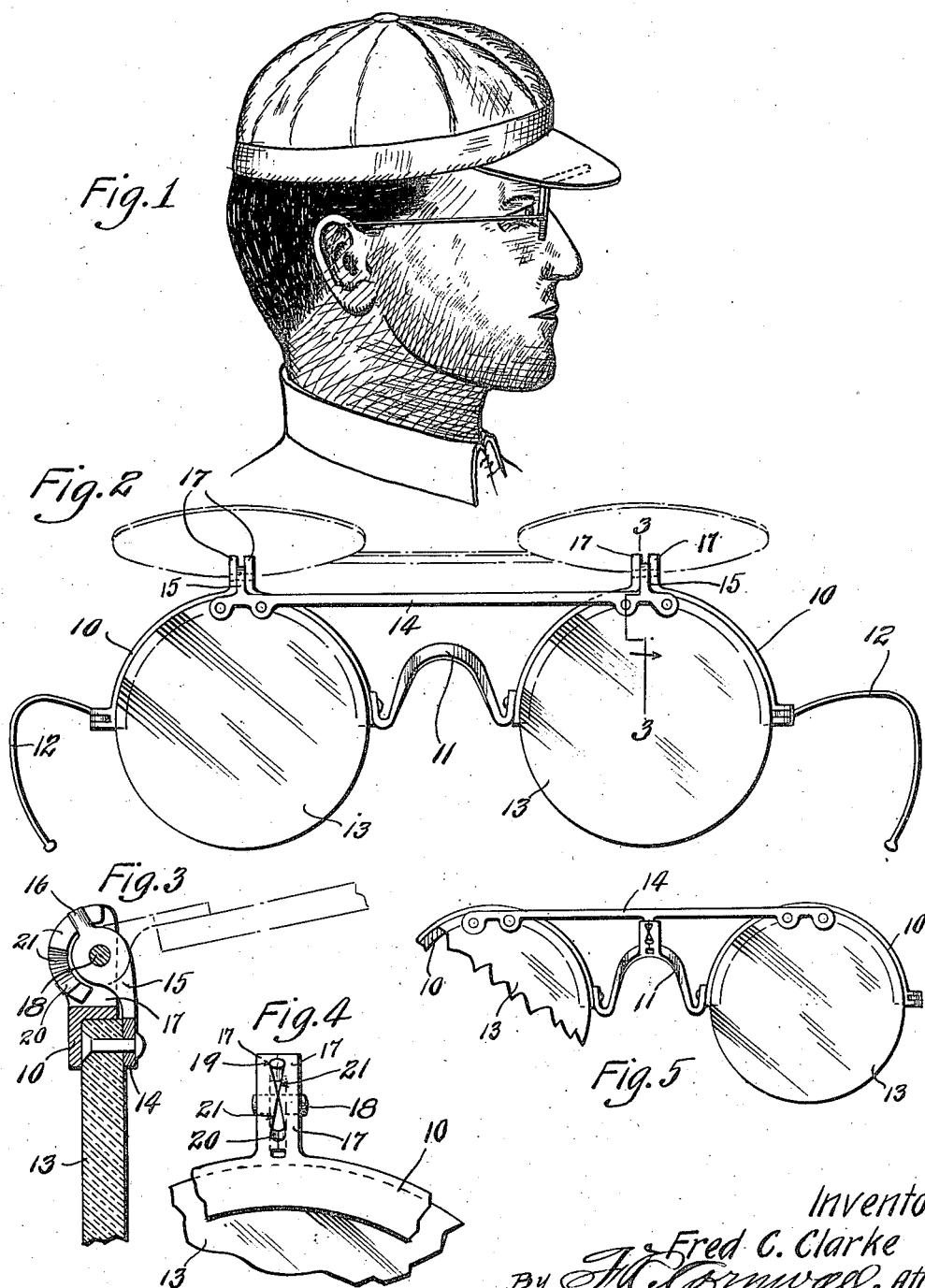
Inventor
Fred C. Clarke

UNITED STATES PATENT OFFICE.

FRED C. CLARKE, OF PITTSBURGH, PENNSYLVANIA.

SUN-GLASSES.

1,181,291. Specification of Letters Patent. Patented May 2, 1916.

Application filed May 19, 1915. Serial No. 29,101.

*To all whom it may concern:*

Be it known that I, FRED C. CLARKE, a citizen of the United States, residing at Pittsburgh, Pennsylvania, have invented a certain new and useful Improvement in Sun-Glasses, of which the following is a full, clear, and exact description, such as will enable others skilled in the art to which it appertains to make and use the same, reference being had to the accompanying drawings, forming part of this specification.

My invention relates to improvements in eye-glasses or spectacles particularly adapted for the use of baseball players whose positions when in the field are such that they are forced to look toward the sun in facing the diamond or the batter.

It will be understood that during the playing of a baseball game, certain of the players and particularly the out-fielders are forced to look toward the sun in following a ball batted to the out-field with the result that the fielder is temporarily blinded by the sun, and consequently loses track of the ball, and it is the principal object of my invention to provide glasses having lenses which are connected by spring hinges to the eye-glass frame and which lenses, under normal conditions occupy an out-of-the-way position above the eyes of the player, and are adapted to be instantly swung downward into position in front of the eyes, thereby enabling the player to follow the ball even while looking toward the sun, it being understood that the lenses of the glasses are colored so as to counter-act or eliminate the bright rays of the sun.

Under ordinary conditions or where a fielder's gaze is directed toward the batter and in following a ground ball or a ball which rolls or bounds along the ground, it is not necessary that the fielder's eyes be protected from the sun rays and consequently it is desirable to have a glass which can be instantly shifted from one position to another so that when the batter hits a fly-ball, the fielder can instantly shift the lenses into position in front of the eyes, thus enabling him to keep track of the ball, even though he may be forced to look directly toward the sun.

While my improved glasses are designed particularly for the use of baseball players, it will be understood that they can be advantageously used by all persons engaged in out-door sports, and who may desire to protect their eyes against the direct rays of the sun.

The glasses are also applicable for use by persons driving and riding in motor cars, engine-drivers, hunters and persons engaged in operating and traveling upon vessels.

With the foregoing and other objects in view, my invention consists in certain novel features of construction and arrangement of parts, hereinafter more fully described, claimed and illustrated in the accompanying drawings, in which—

Figure 1 is a view illustrating the practical use of my improved glasses. Fig. 2 is a front elevational view of the glasses with dotted lines showing the position occupied by the lenses when the same are elevated. Fig. 3 is an enlarged vertical section taken approximately on the line 3—3 of Fig. 2. Fig. 4 is a rear elevational view of one of the hinges between the frame and the lens. Fig. 5 is a front elevational view of a modified form of the glasses.

In the construction of my improved glasses, I make use of a frame comprising a pair of substantially semi-circular rim members 10 which may be formed of any desirable material, such as metal or celluloid, and the inner ends of these rim members are united by a substantially inverted U-shaped nose-piece 11. Hinged to the outer ends of the rim members 10 are the forward ends of bows 12, the rear ends of which are adapted to engage over or behind the ears of the wearer after the manner of ordinary spectacles.

The rim members 10 are preferably L-shape in cross section, thereby providing combined bearings and seats for the upper portions of the lenses 13, which latter are preferably circular disks of glass or analogous transparent material, the same being colored either gray, blue or yellow so as to counter-act or eliminate the direct rays of the sun.

In the preferred form of the device the upper portions of the lenses 13 are fixed in any suitable manner to the ends of a comparatively light, strong cross-bar 14 and formed integral with or fixed to the ends of this cross-bar and projecting upwardly therefrom are disks 15 from which project upwardly and rearwardly short pins such as 16, the same being preferably round in cross section. The disks 15 occupy positions between corresponding pairs of resilient plates 17, the same projecting upwardly from the tops of the rim members 10 and said disks being hinged or pivotally mounted upon pins 18, the ends of which are loosely seated in said plates 17.

The meeting faces of the rear portions of each pair of plates 17 are cut away so as to form a seat 19 near the tops of said plate, and a seat 20 near the lower portions of said plates, these seats being adapted to receive the corresponding pin 16 which projects from the disk 15.

The inner faces of the rear portions of the plates 17 between the seats 19 and 20 are inclined as designated by 21, said inclined faces converging toward a central point between the seats 19 and 20 and by virtue of such construction and for the reason that the plates 17 are resilient, the pin 16 will be frictionally and yieldingly held in either of the seats 19 and 20 and when the lens is shifted from one position to another as hereinafter described, the corresponding pin 16 will bear against the pairs of inclined faces 21 and after passing the central point between the seats or the point where the inclined faces meet, said pin will snap or move quickly into the corresponding seat by reason of the pressure exerted by the pairs of plates 17 against said pin.

The seats 19 and 20 are arranged at an angle of approximately one hundred degrees apart with the seats 19 positioned so that when pins 16 are seated therein, the lenses occupy a substantially vertical plane immediately in front of the eyes as seen in Fig. 1, it being understood, of course, that when said lenses are in this position, their upper edges are seated in the rim members 10.

When the lenses are swung upward and the pins 16 occupy the lower seats 20, the lenses are slightly inclined with respect to a horizontal plane as illustrated in Figs. 1, 2 and 3, and when so positioned the wearer of the glasses has a comparatively free and unobstructed vision.

Practically all caps worn by baseball players are uniform in construction in that they are provided with a vizor, which to a certain extent acts as an eye-shield and when my improved glasses are worn by a ball player and the lenses of the glasses are elevated, said lenses will occupy an out-of-the-way position immediately beneath the vizor.

When a batsman hits a fly-ball toward a fielder and the latter in order to get to a position to catch said ball must necessarily look toward the sun, it is essential that the sun-glasses be brought into a position in front of the eyes instantaneously, and to accomplish this, it is only necessary for a player to strike the front of the vizor of his cap with a quick downward movement of the hand and such action bears downward upon the outer portions of the lenses lying immediately beneath the vizor and as a result, said lenses will be swung quickly downward into position against the rim members 10. This operation can be accomplished in a fraction of a second and consequently the player is enabled to follow the fly-ball even though the same traverses the field of vision between the player and the sun.

As hereinbefore stated, the inclined faces 21 between the seats 19 and 20 and the pressure exerted by the resilient plates 17 are instrumental in accelerating the movement of the pins 16 from one pair of seats to the other and consequently the movement of the lenses from one position to another is accomplished with comparative rapidity.

In the modification illustrated in Fig. 5, the cross-bar 14 which carries the lenses 13 is hinged directly to the upper portion of the nose-piece 11 and in such construction the same form of hinge as the one herein described is utilized. To raise the lenses or shift the same from a vertical to a substantially horizontal position, it is only necessary to engage the thumb or finger beneath the lower edge of one of the lenses and force the same outwardly and upwardly.

Eye-glasses of my improved construction are comparatively simple, can be easily and quickly shifted from one position to another and while particularly adapted for baseball players, can be advantageously used by all persons engaged in outdoor occupations and sports where it is desired to shield the eyes from the direct rays of the sun or from the glare or reflection of the sun-rays upon water or comparatively bright surfaces.

Glasses of my improved construction are particularly applicable for use by persons driving motor vehicles inasmuch as the lenses can be easily and quickly shifted from one position to the other by using one hand, thereby permitting the other hand to remain on the steering wheel.

My improved glasses can be advantageously used by workmen in the furnace rooms of foundries as a protection for the eyes against the heat, sparks and high color of molten metal.

It will be readily understood that minor changes in the size, form and construction of the various parts of my improved eye-glasses can be made and substituted for those herein shown and described, without departing from the spirit of my invention, the scope of which is set forth in the appended claims.

I claim:

1. The hereindescribed sun glasses comprising a frame including a pair of substantially inverted U-shaped members, a pair of spring plates integral with the upper portion of each inverted U-shaped member, a pair of lenses, a bar connecting the upper portions of said lenses, ears projecting upwardly from said bar, which ears are positioned between and hinged to the pairs of ears on the frame, and a pin projecting from each ear and having rubbing contact with the inner faces of the corresponding pairs of spring plates.

2. The hereindescribed sun glasses comprising a frame including a pair of substantially inverted U-shaped members, a pair of spring plates integral with the upper portion of each inverted U-shaped member, the inner faces of each pair of plates being provided with pairs of inclined bearing faces, a pair of lenses, a bar connecting the upper portions thereof, ears projecting upwardly from said bar, which ears are positioned between and pivotally connected to the pairs of spring plates, and pins on said ears, which pins are adapted to engage the pairs of inclined bearing faces on the spring plates.

3. The hereindescribed sun glasses comprising a frame including a pair of substantially inverted U-shaped members, a pair of spring plates integral with the upper portion of each inverted U-shaped member, there being pockets formed between said pairs of spring plates, the walls of which pockets are inclined so that said pockets gradually widen in both directions from a central point, a pair of lenses, a bar connecting the upper portions thereof, ears projecting upwardly from said bar, which ears are positioned between and pivotally connected to the pairs of spring plates, and pins on said ears, which pins are adapted to occupy said pockets and bear against the inclined faces of the walls thereof.

4. In sun glasses of the class described, a frame including a pair of substantially inverted U-shaped members, a pair of lenses, a bar connecting the upper portions of said lenses, and spring hinges between said bar and the upper portions of the inverted U-shaped members, the bearing faces of the parts of which hinges are constructed so as to cause the lenses to swing to their limit of movement in either direction after said lenses have been manually swung through a portion of their arc of movement.

In testimony whereof I hereunto affix my signature in the presence of two witnesses, this fifteenth day of May, 1915.

FRED C. CLARKE.

Witnesses:
DAVID L. WILLIAMS,
WILLIAM J. MULLONEY.